Figure 1:
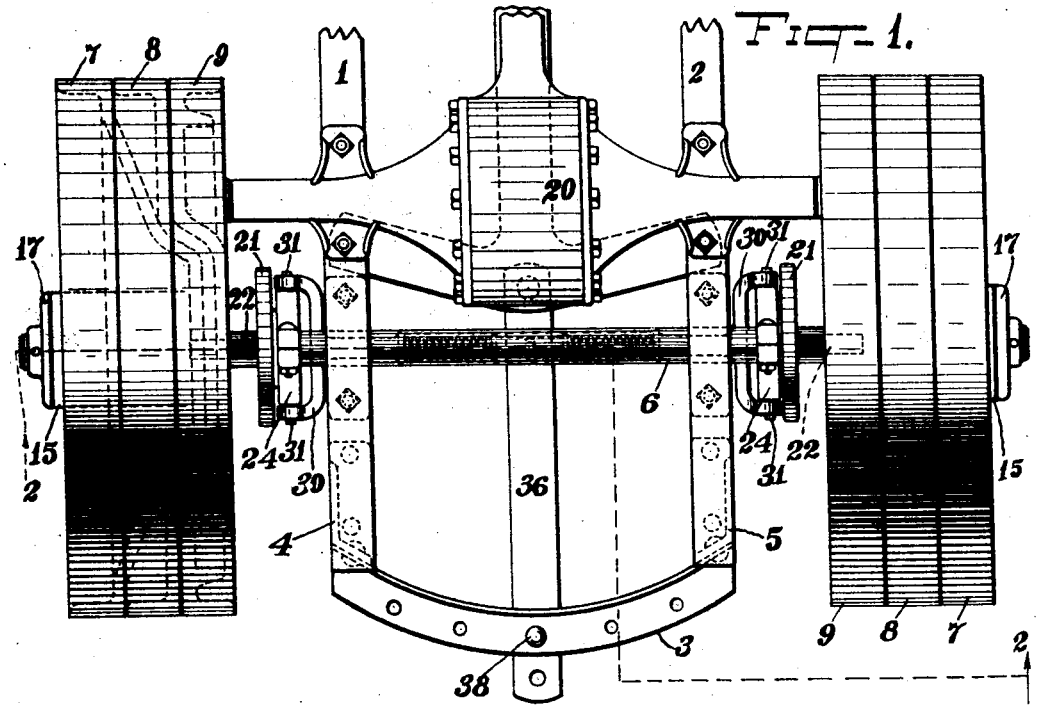

Sept. 25, 1928.   W. L. PAUL   1,685,375
SIDE DRAFT CONTROL FOR TRACTORS
Filed July 5, 1923   2 Sheets-Sheet 1

Inventor:
WILLIAM L. PAUL

Witness;
E. Wilderson

Sept. 25, 1928.  
W. L. PAUL  
1,685,375  
SIDE DRAFT CONTROL FOR TRACTORS  
Filed July 5, 1923 2 Sheets-Sheet 2
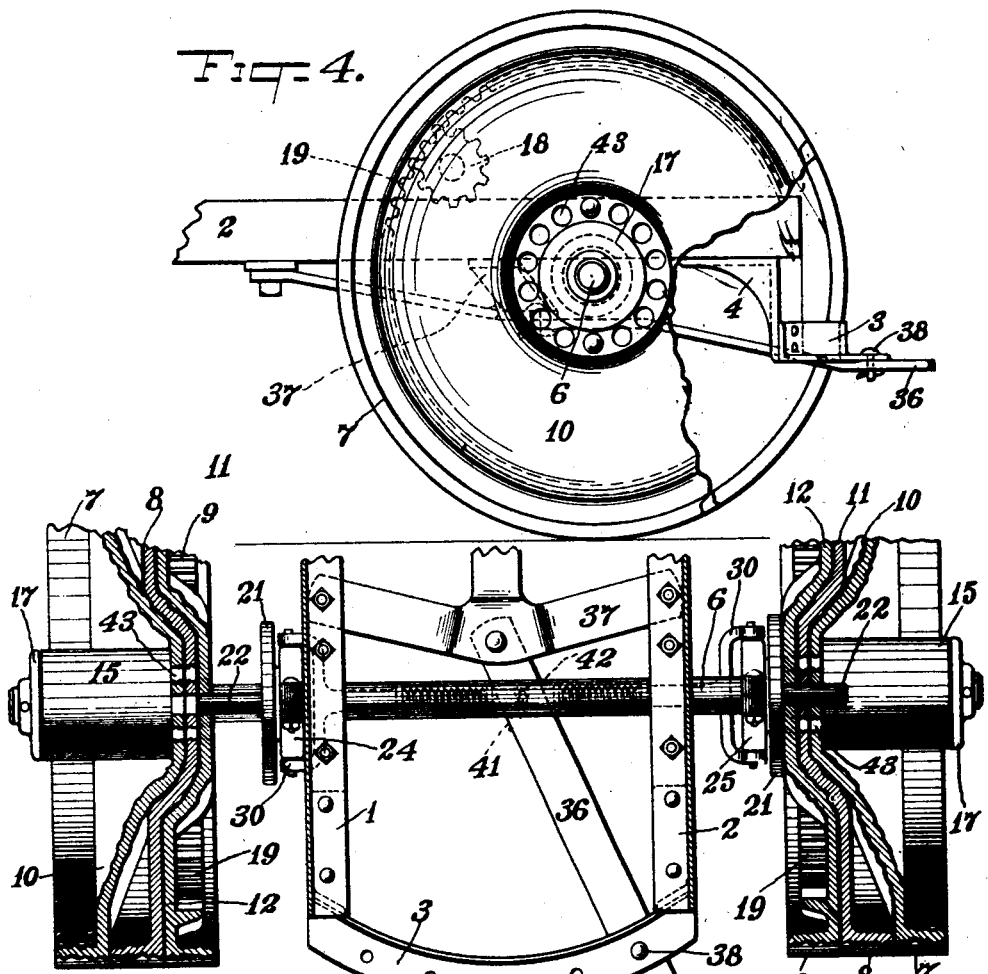
Inventor;  
WILLIAM L. PAUL Patented Sept. 25, 1928.

1,685,375

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

SIDE-DRAFT CONTROL FOR TRACTORS.

Application filed July 5, 1923. Serial No. 649,470.

My invention relates to tractors, and more particularly to means devised for the purpose of regulating the traction power of one of the tractor wheels relative to the other and opposite wheel.

The object of my invention is to provide means for increasing or diminishing the traction power of either one of the driven wheels of the tractor whereby side draft created by the pull of a body drawn by the tractor, and hitched thereto to either side of the central longitudinal line of the tractor, can be effectively controlled.

Referring to the drawings in which similar numerals indicate identical parts—

Figure 2:
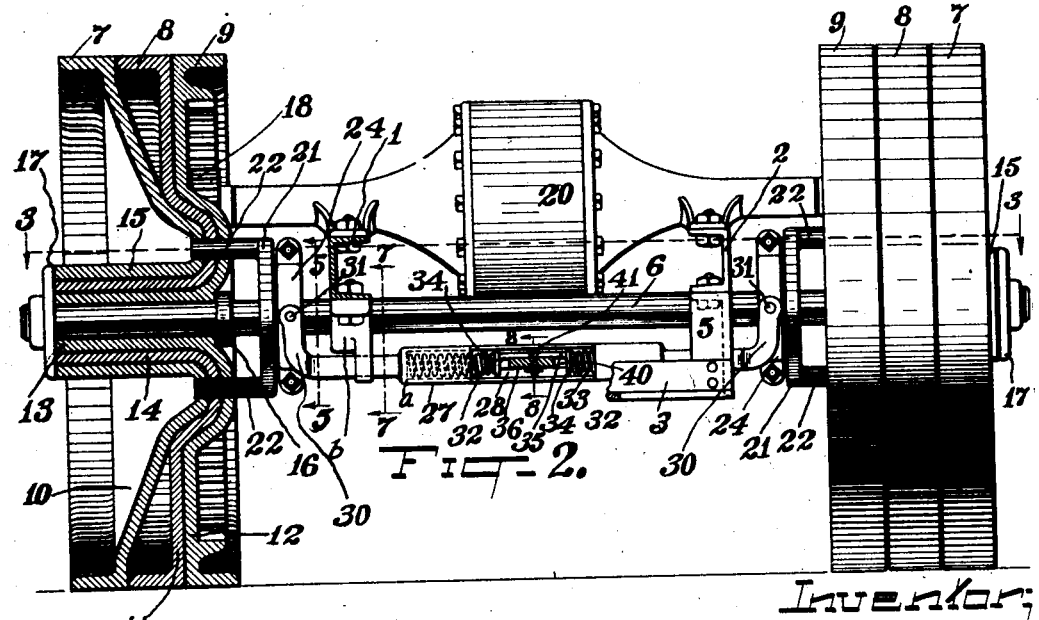

Figure 1 is a plan view of a tractor embodying my invention. Figure 2 is a rear view of Figure 1, in part section on the line 2—2 of Figure 1. Figure 3 is a section on the line 3—3 of Figure 2. Figure 4 is a side view of one of the wheels. Figure 5 is a detail section on the line 5—5 of Figure 2. Figure 6 is a section on the line 6—6 of Figure 5. Figure 7 is a detail section on the line 7—7 of Figure 2, and Figure 8 is a detail section on the line 8—8 of Figure 2.

The part of the tractor shown includes side beams 1 and 2, and a rear transverse arcuate beam 3, the latter rigidly secured to brackets 4 and 5 on the beams 1 and 2 respectively. An axle 6 is mounted in suitable supports $b$ on the beams 1 and 2 and journaled on the axle are the power wheels of the tractor which are exactly alike and are controlled by my device in the same way.

Each wheel is composed of sections 7, 8 and 9 in which disks 10, 11 and 12 are substituted for spokes. Hubs 13 are formed preferably integral with the disks 12 of the sections 9 and are rotatably mounted on the axle 6. Similar hubs 14 on the disks 11 are journaled on the hubs 13, and the hubs 15 of the disks 10 are rotatably mounted on the hubs 14. Collars 16 on the axle 6 and washers 17 on the outer ends thereof operate to prevent movement of the wheels longitudinally of the shafts, the washers 17 also serving to retain the sections 7, 8 and 9 closely together so that their rims present a joint tread surface. The washers 17 are secured in place in any suitable manner.

When not connected together, in a manner hereinafter explained, each section is capable of rotating independently by contact with the ground, and when connected together are rotated simultaneously by power, from the engine of the tractor, which is conveyed through pinions 18 in mesh with annular gears 19 integral with the sections 9. The pinions 18 are mounted on shafts rotated by the differential gearing in the housing 20 and not shown in the drawings.

The sections 9 of the wheel are, therefore, continuously rotated and to rotate the remaining sections of the wheels simultaneously with the sections 9, I connect them by clutch devices as shown more clearly in Figure 2. Each clutch includes a disk 21 slidably mounted on the axle 6 and having diametrically opposite pins 22 extending outwardly from the faces of the disks. The disks are preferably integral with hubs 23, as detailed in Figure 6, having a circumferential groove 24 in each hub.

Surrounding the hubs 23 are split couplings 25 which are provided with annular flanges 26 to loosely engage with the grooves 24 in the hubs 23, the parts of the couplings being secured together by suitable bolts.

A clutch controlling member $a$ includes a central tubular body 27 provided with a rearward opening 28 intermediate the length of the member. Extending from the tubular body 27, the member $a$ is rectangular in cross section to fit in rectangular guideways 29 on the underside of the supports $b$. The member $a$ terminates in upstanding yokes 30 which embrace the couplings 24 and are attached thereto by pins 31. Encased in the tubular portion of the member $a$ are helical springs 32 held in place by the closed portion of the member $a$ and by studs 33 on a vertical circular parts 34 of a horizontal bar 35. A hitch bar 36 is pivotally attached to a bar 37, secured to the side beams 1 and 2, and extends rearwardly beneath the arcuate beam 3 to which it is connectible, in various positions, by a pin 38 insertable in a hole in the bar 36 and any one of a series of holes 39 in the beam 3. The hitch bar 36 extends through a slot 40 and the opening 28 in the tubular body 27 and is attached to the bar 35 by a bolt or pin 41 inserted in the bar 35 and passing through a slot 42 in the hitch bar.

As shown in Figures 1 and 2, the line of draft is central of the tractor and the sections 7, 8, and 9 of each wheel are connected together, pins 22 of the clutches engaging with holes 43 in each of the disks 7, 8 and 9, each disk having a series of such holes into which the pins 22 are adapted to fit. Presuming that the body to be drawn by the tractor is to be offset either to the right or left of the central longitudinal line of the tractor the pin or bolt 38 is removed and the hitch bar 36 is swung on its pivot on the bar 37 to the desired degree for the offset required and the pin again is inserted in the hole in the hitch bar and the registering hole, in the arcuate beam 3, securing the beam and bar rigidly together. As shown in Figure 3, the position of the hitch bar indicates an offset to the right; now as the hitch bar 36 is swung, to the position shown in Figure 3, it actuates the member $a$ to withdraw the pins 22 of the left clutch from the holes 43 in the sections 7 and 8 of the left wheel whereby the sections 7 and 8 are free to rotate only by contact with the ground and consequently are deprived of traction power which is now carried by the remaining section 9 and the right wheel. The pins 22 of the clutches are at all times engaged with the sections 9 of the wheels, the clutches rotating therewith but are readily slidable upon the axle 6 to withdraw the pins 22 from the sections 7 or from both the sections 7 and 8 according to the swing of the hitch bar 36 to accommodate the degree of offset required for the body drawn by the tractor. When the hitch bar 36 is swung again to a central position from the right offset shown, the left clutch is moved, by actuation of the member $a$, to engage with holes in the sections 7 and 8 of the left wheel, the holes in the sections 7 and 8 may not be in position, however, to receive the pins 22, consequently there must be a resilient connection between the hitch bar 36 and the member $a$, and this I have provided in the springs 32, for as the hitch bar 36 is swung to right or left the corresponding spring in the member $a$ is compressed through the connection of the hitch bar with the bar 35, and if the holes in the freed sections of the wheel, toward which the hitch bar is swung, register with the holes in the section 9 the pins will readily enter and again hold the sections together, but if the holes do not register, when the hitch bar is swung, then the pressure of the spring, compressed by movement of the bar, is exerted against the clutch to engage the pins 22 with the holes in the freed sections when, in the rotation thereof, the holes therein register. The section 7 or the sections 7 and 8 of either wheel can be freed according to the degree of offset to the right or left required.

It is evident that the freed sections 7 or 8, or both, have no traction but rotates loosely on the axle 6, and if the parts are as shown in Figure 3, where sections 7 and 8 of the left wheel are free, there is a proportionate excess of traction of the right wheel over the left and this excess is varied by freeing section 7 only of the left wheel when the hitch bar 36 is swung to a position between the longitudinal central line of the tractor and the limit to which the hitch bar can be swung, and by creating this excess of traction in either wheel, depending upon which side the offset is made, side draft, which would otherwise be present, is practically eliminated and the steering of the tractor requires less care and effort.

What I claim is—

1. In a tractor having a pivoted draw bar, the combination of a frame, an axle supported on the frame, traction wheels journaled on the axle, each wheel composed of a plurality of sections, and means operable by the draw bar to connect one or more of said sections with the driving mechanism of the tractor.

2. In a tractor, the combination of a frame, a hitch device pivotally mounted on the frame to swing laterally, an axle supported on the frame, traction wheels journaled on the axle, each wheel composed of a plurality of sections, one section of each wheel permanently connected with a source of power and normally connected to the other sections for simultaneous rotation, and means on the axle operative by swinging said device to disconnect a section of either wheel from the remaining sections thereof.

3. In a tractor, the combination of a frame a hitch device pivotally mounted on the frame to swing laterally, an axle supported on the frame, traction wheels journaled on the axle, each wheel composed of a plurality of sections, one section of each wheel permanently connected with a source of power and normally connected to the other sections for simultaneous rotation, and means on the axle operative by swinging said device to disconnect a plurality of sections of either wheel from the power operated section thereof.

4. In a tractor, the combination of a frame, an axle supported on the frame, traction wheels journaled on the axle, each wheel composed of a plurality of sections, one section of each wheel permanently connected with a source of power, a hitch element pivotally supported on the frame and laterally adjustable to vary the line of draft, and means connected with both wheels and with the hitch element and operating by the adjustment of said element to limit the traction power of one of said wheels to one or more sections thereof.

5. In a tractor, the combination of a frame, an axle supported on the frame, traction wheels journaled on the axle, each wheel composed of a plurality of sections, one section of each wheel permanently connected with a source of power, means connecting the sections of each wheel together for simultaneous rotation, a hitch element pivotally supported on the frame and laterally adjustable to vary the line of draft and co-operating with said connecting means to release the sections of one wheel from the power driven section thereof by adjustment of said element.

6. In a tractor, the combination of a frame, an axle supported on the frame, traction wheels journaled on the axle, each wheel composed of a plurality of sections including a power driven section, means connecting the sections of each wheel together for simultaneous rotation, a hitch device pivotally supported on the frame and adjustable laterally to vary the line of draft, a clutch for each wheel connected with said device and operating by the adjustment thereof to hold the sections of one wheel together or to release them from the power driven section thereof.

7. In a tractor, the combination of a frame, an axle supported on the frame, traction wheels journaled on said axle, each wheel composed of a plurality of sections secured together when the line of draft is central of the tractor and including a power driven section, and mechanism operating to release the sections of one wheel from each other when the line of draft is shifted toward either side of the tractor.

8. In a tractor, the combination of a frame, an axle supported on the frame, traction wheels journaled on said axle, each wheel composed of a plurality of sections, a hitch device pivotally mounted on the tractor and adjustable laterally to vary the line of draft, mechanism operating to secure the sections of both wheels together when the line of draft is central of the tractor, said mechanism connected with the hitch device and operable thereby to free the sections of one wheel by shifting the line of draft toward either side of the tractor.

9. In a tractor, the combination of a frame, an axle supported on the frame, traction wheels journaled on the axle, each wheel composed of a plurality of sections, one section of each wheel permanently connected with a source of power, a hitch element pivotally supported on the frame and laterally adjustable to vary the line of draft, and a clutch for each wheel carried on the axle and connected with said hitch element and operative by adjustment thereof to limit the traction power of one of said wheels to one or more sections thereof.

10. In a tractor, the combination of a frame, an axle supported on the frame, traction wheels journaled on the axle, each wheel composed of a plurality of sections, one section of each wheel permanently connected with a source of power, a hitch element pivotally supported on the frame and laterally adjustable to vary the line of draft, and a clutch for each wheel carried on the axle and connected with said hitch element and operative by adjustment thereof to hold the sections of one wheel together or to release them from the power-driven sections thereof.

11. In a tractor, the combination of a frame, an axle supported on the frame, traction wheels journaled on the axle, each wheel composed of a plurality of sections, a hitch device pivotally mounted on the tractor and adjustable laterally to vary the line of draft, mechanism operating to secure the sections of both wheels together when the line of draft is central of the tractor, said mechanism resiliently connected with the hitch device and operable thereby to free the sections of one wheel by shifting the line of draft toward either side of the tractor.

WILLIAM L. PAUL.